United States Patent
Felton et al.

(10) Patent No.: US 8,005,999 B1
(45) Date of Patent: Aug. 23, 2011

(54) DATA STORAGE SYSTEM WITH PCI-E EXTENDED REACH CAPABILITY

(75) Inventors: Mickey S. Felton, Sterling, MA (US); Simba M. Julian, Dorchester, MA (US)

(73) Assignee: EMC Corporation, Hopkinton, MA (US)

( * ) Notice: Subject to any disclaimer, the term of this patent is extended or adjusted under 35 U.S.C. 154(b) by 14 days.

(21) Appl. No.: 11/862,512

(22) Filed: Sep. 27, 2007

(51) Int. Cl.
*G06F 3/00* (2006.01)

(52) U.S. Cl. .......................................... 710/16

(58) Field of Classification Search ....................... 710/16
See application file for complete search history.

(56) References Cited

U.S. PATENT DOCUMENTS

| | | | |
|---|---|---|---|
| 6,498,535 B1 | 12/2002 | Allen et al. | |
| 7,536,508 B2 * | 5/2009 | Davies | 711/114 |
| 2005/0015532 A1 * | 1/2005 | Beckett et al. | 710/105 |
| 2006/0129733 A1 | 6/2006 | Sobelman | |
| 2006/0230218 A1 * | 10/2006 | Warren et al. | 710/315 |
| 2007/0214299 A1 * | 9/2007 | Lo | 710/301 |
| 2007/0226385 A1 * | 9/2007 | Liu et al. | 710/62 |
| 2007/0255857 A1 * | 11/2007 | Loffink et al. | 710/1 |

OTHER PUBLICATIONS

Article: PCI Express and The PHY(sical) Journey to Gen 3 by Reginald Conley.*
Hewlett Packard slides Serial Attached SCSI Physical Layer by Rob Elliot.*
Felton et al.; PCI-E Extended Reach with Receive Detect Circuitry; U.S. Appl. No. 11/862,491, filed Sep. 27, 2007; 15 pages.
Non-Final Office Action for U.S. Appl. No. 11/862,491 dated Aug. 5, 2009; 9 pages.

* cited by examiner

*Primary Examiner* — Henry W Tsai
*Assistant Examiner* — Eric T Oberly
(74) *Attorney, Agent, or Firm* — Guerin & Rodriguez, LLP; Mary M. Steubing

(57) ABSTRACT

A type one protocol device transmitter performs a detection function to detect attached type one protocol receivers. The detection function operates such that receivers having type two termination are not detected as type one protocol receivers. A type two protocol device receiver has type two termination. Logic is coupled between the type two protocol device receiver and the type one protocol device transmitter so that the type one protocol device transmitter detection function detects the type two protocol device receiver as a type one protocol receiver. The type one protocol device can be a PCI-E device, and the type two protocol device can be a SAS/SATA device.

12 Claims, 8 Drawing Sheets

DATA STORAGE SYSTEM WITH PCI-E EXTENDED REACH CAPABILITY

CROSS REFERENCE TO RELATED APPLICATIONS

This Application is related to co-pending and commonly assigned Utility Patent Application entitled "PCI-E Extended Reach With Receive Detect Circuitry", by Mickey S. Felton and Simba M. Julian, application Ser. No. 11/862,491, filed on Sep. 27, 2007.

FIELD OF THE INVENTION

The invention relates to high performance interconnect architectures, and particularly to mechanisms for coupling devices of different interconnect protocols.

BACKGROUND OF THE INVENTION

Serial interconnects such as the PCI-Express® interconnect (PCI-E) are used in high performance systems such as today's data storage systems as high speed memory and I/O interconnects. (PCI-Express® is a registered trademark of PCI-SIG.) PCI-E transfers data via differential signal pairs called "Lanes". In order to transmit very high speed signals that can be cleanly received, the physical run lengths of the differential signal pairs are limited. In order to extend the run lengths of the PCI-E signals, a PCI-E bridge or switch is typically used. These devices are expensive and incorporate buffering that adds latency into the signal path—latency that is often unacceptable in high performance system designs.

SUMMARY OF THE INVENTION

In accordance with the invention, logic is provided to allow a transmitter in a type one protocol device to recognize a receiver in a type two protocol device as a receiver of the type one protocol. The type two protocol device can thus be used to extend the type one protocol interconnect. This allows low cost, low latency devices to be used to as interconnect extenders. For example, a SAS/SATA receiver can be used to extend a PCI-E interconnect.

In particular, a type one protocol device transmitter performs a detection function to detect attached type one protocol receivers. The detection function operates such that receivers having type two termination are not detected as type one protocol receivers. A type two protocol device receiver has type two termination. Logic is coupled between the type two protocol device receiver and the type one protocol device transmitter so that the type one protocol device transmitter detection function detects the type two protocol device receiver as a type one protocol receiver. In one embodiment, the type one protocol device is a PCI-E device, and the type two protocol device is a SAS/SATA device. The transmitter and receiver are differential, and the logic for each signal line of the differential pair includes a capacitor in series, and a ferrite and resistor in parallel.

DETAILED DESCRIPTION OF EXEMPLARY EMBODIMENTS

Figure 1:
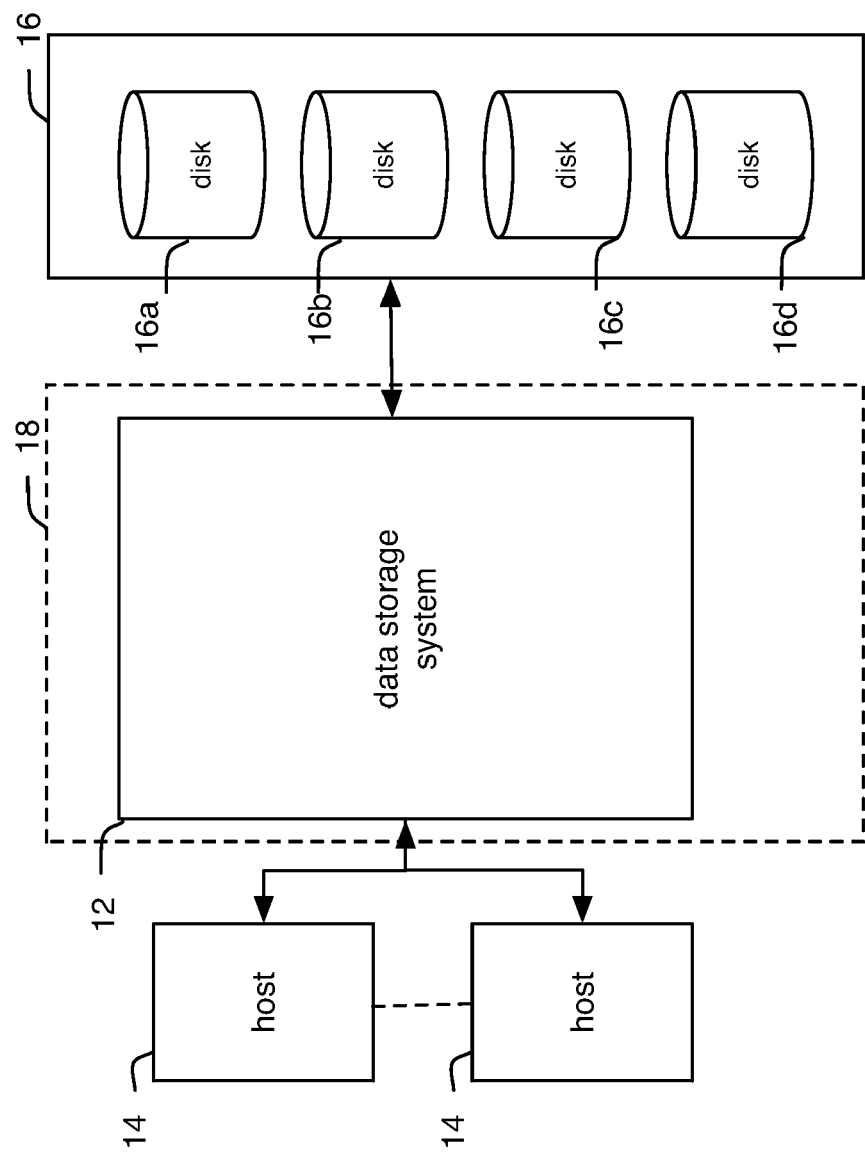
FIG. 1 is a schematic diagram of a data processing system in which the invention can be employed.

Referring to FIG. 1, a data processing system 10 includes a high performance data storage system 12 coupled to hosts 14 and to disk storage 16 (16a ... 16d). The disk storage 16 may reside with the chassis 18 of the data storage system 12 or it may reside external to it. The hosts 14 and data storage system 12 may communicate via many known front end protocols such as Fibre Channel, 10G Ethernet, etc. The data storage system 12 and disk storage 16 may communicate via many known back end protocols such as Fibre Channel, SAS, SATA, etc.

High performance systems such as the data processing system 10 of FIG. 1 often employ high performance interconnects such as PCI Express, Fibre Channel, SAS, SATA, etc. Different interconnect protocols have their advantages and disadvantages, and they are not generally interoperable. At times it is desirable to use a device designed for use with one protocol with a device designed for use with another protocol, perhaps in order to minimize latency and/or cost. In accordance with the invention as further described herein, logic is provided to allow a transmitter in a type one protocol device to recognize a receiver in a type two protocol device as a receiver of the type one protocol. This allows the type two protocol device to be used, for instance, to extend the length of the type one protocol interconnect. In the exemplary embodiments, a SAS/SATA receiver is recognized as a PCI-E receiver, and thus can be used to extend a PCI-E interconnect.

Figure 2:
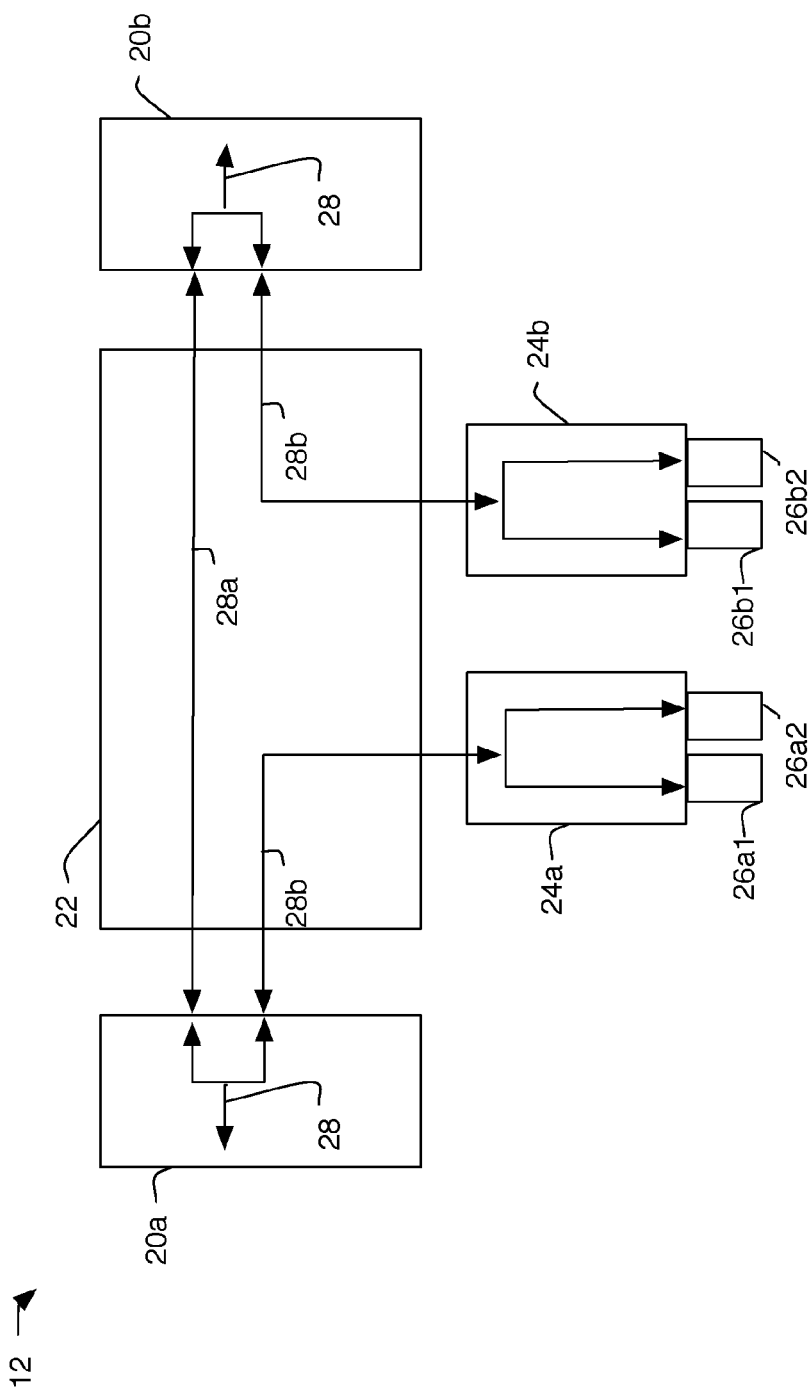
FIG. 2 is a schematic diagram of the data storage system of FIG. 1.

Referring to FIG. 2, the data storage system 12 of FIG. 1 is shown to be of the highly available type available from EMC Corporation in Hopkinton, Mass. across its product lines. The system 12 includes dual processor blades 20a, 20b coupled to a midplane 22. I/O boards 24a, 24b are also coupled to the midplane 22. I/O devices 26a1, 26a2, and 26b1, 26b2 may be further coupled to the I/O boards 24a, 24b, respectively. The blades 20a, b and I/O boards 24a, b are all interconnected over the midplane 22 via a high performance interconnect 28. The interconnect 28 is sourced from the blades 20a, b and is switched between interconnects 28a, 28b across the midplane. The high performance interconnect 28 is preferably a serial interconnect such as the PCI Express® interconnect (hereinafter "PCI-E"), fully described in the PCI Express Base Specification Revision 1.1. It is desirable to use PCI-E as the communications protocol between the processor blades 20a, b and I/O boards 24a, b and attachments 26 for its performance advantages; however, PCI-E signal lengths are limited. For example, in order to run the PCI-E interconnect 28b across the midplane 22 and I/O boards 24 to attached devices 26, another PCI-E switch or bridge would traditionally be placed on the I/O boards 24—but for many applications this solution has unacceptably high latency. Therefore, in accordance with the invention, logic including a device of a different protocol is used to extend the PCI-E interconnect 28 across the I/O boards 24a, b.

Figure 3:
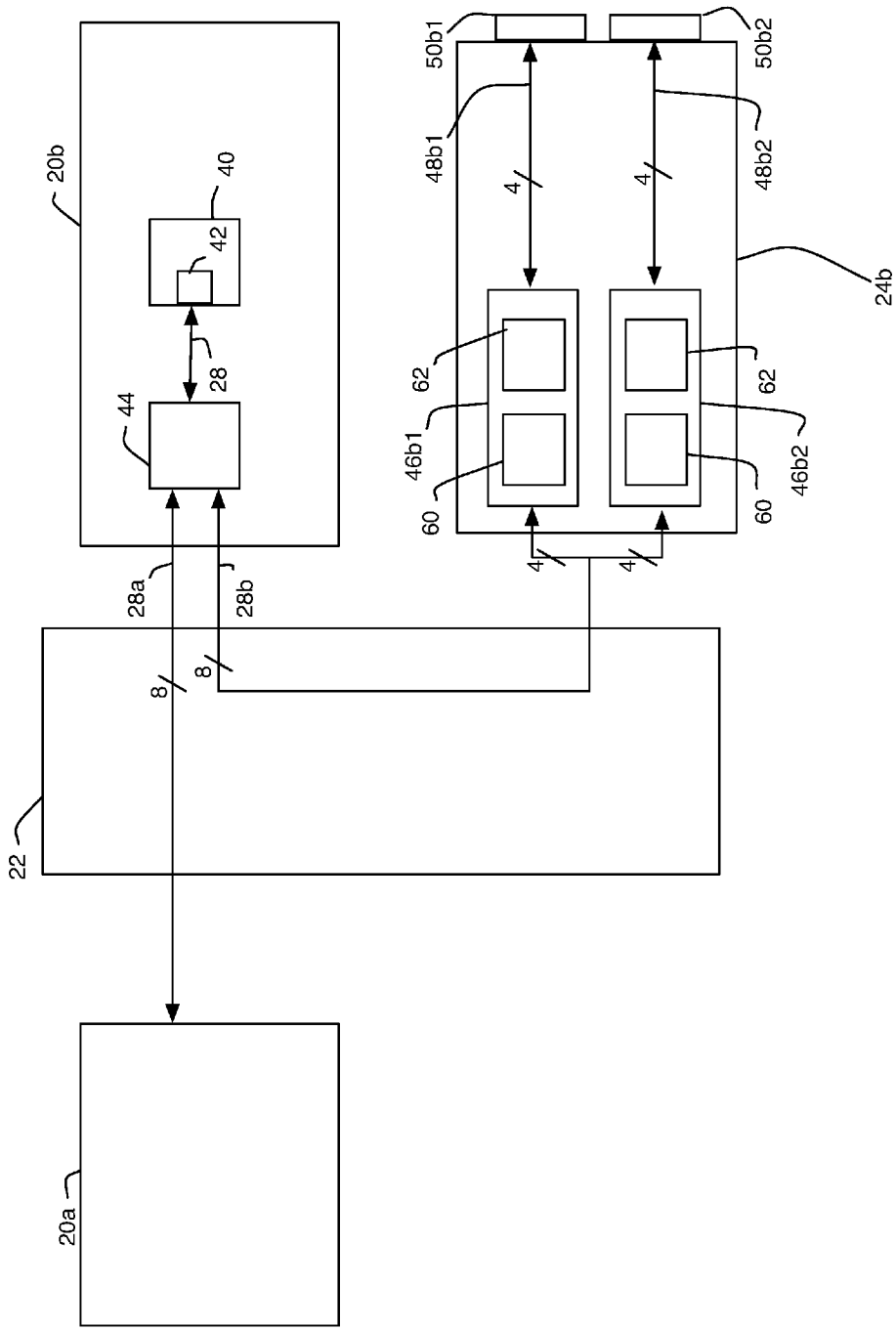
FIG. 3 is a schematic diagram of a blade, the midplane, and an I/O board of FIG. 2 incorporating the invention.

Referring to FIG. 3, the blade 20b, midplane 22, and I/O board 24b are shown in more detail. The blade 20b is shown to include a processor 40 having PCI-E root complex 42 coupled to a PCI-E switch 44 via PCI-E lanes 28. Lanes 28*a*, herein shown as 8 lanes though it is understood that any valid number of PCI-E lanes could be run, are coupled from the PCI-E switch 44 across the midplane 22 to a similar PCI-E switch (not shown) on the processor blade 20*a*. These lanes 28*a* are used for inter-processor communication between the blades 20*b* and 20*a*. A second set of lanes 28*b*, herein shown as 8 lanes though it is understood that any valid number of PCI-E lanes could be run, are coupled from the PCI-E switch 44 across the midplane 22 to the I/O board 24*b*, where they are coupled to a set of signal buffers 46*b*1, 46*b*2. Each signal buffer 46*b*1, 46*b*2 receives 4 lanes of the 8 PCI-E lanes 28*b*. PCI-E lanes 48*b*1, 48*b*2, each also 4 lanes wide, are coupled between signal buffers 46*b*1, 46*b*2 and connectors 50*b*1, 50*b*2 on the I/O board 24*b*. I/O devices 26*b*1, 26*b*2 (FIG. 2) may be coupled to the PCI-E lanes 48*b*1, 48*b*2 via connectors 50*b*1, 50*b*2 respectively.

The signal buffers 46*b*1, 46*b*2 are shown to include receive detect logic 60 and serial buffer 62. The serial buffer 62 is of the type used to buffer and sometimes switch serial differential data signals of a different protocol than PCI-E—such as SAS and SATA signals. This is a low cost buffer with very low latency as compared to available PCI-E switches. One example of such a serial buffer is the PM8380 from PMC Sierra. In this application, the PM8380 switching (multiplexing) function is not used; it is used solely as a buffer. If used to buffer the PCI-E signals from the blade 20*b* across the I/O board 24*b*, latency requirements can be met and all PCI-E specifications for link training and full speed signaling (2.5 Gb/s per link) are also met. But, it has been found that this type of buffer cannot be used stand-alone to buffer PCI-E signals because the PCI-E transmitters cannot recognize the SAS/SATA receivers as valid PCI-E capable receivers for the following reason.

Figure 4:
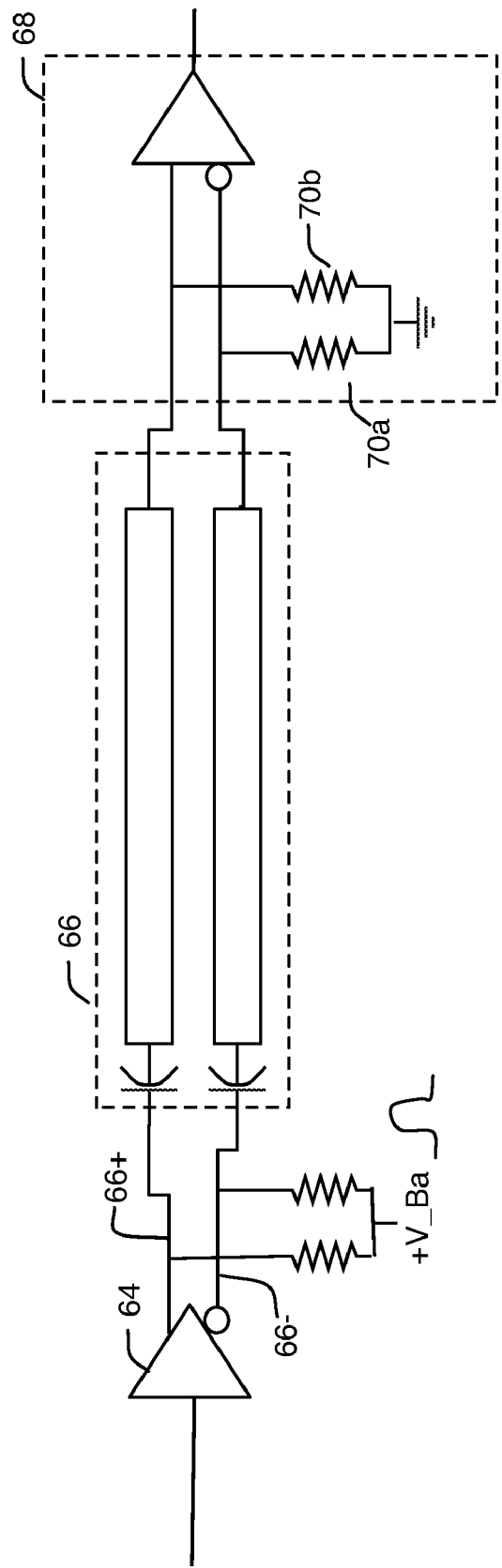
FIG. 4 is a schematic diagram of a PCI-E transmitter and receiver model for PCI-E receive detect.

The PCI-E protocol includes a Receive Detect function. Referring to FIG. 4, there is shown a PCI-E transmission line including PCI-E differential transmitter 64, transmission line 66, and PCI-E differential receiver 68. The receiver 68 is a 100 ohm receiver functionally consisting of two 50 ohm resistors 70*a*, 70*b*, each coupled to ground. The PCI-E Receive Detect function operates by sending via the transmitter 64 a common mode signal (i.e. a positive voltage pulse herein shown as +V_Ba) down each signal line of the differential pair 66. If a PCI-E receiver such as 68 is coupled to the PCI-E transmitter 64, each transmission line 66+, 66− will slowly charge over time through the line capacitance and each 50 ohm termination resistor 70*b*, 70*a* to ground. If no PCI-E receiver is coupled to the PCI-E transmitter 64, no charging will occur and the circuit will appear open. In this case, the PCI-E circuitry will not proceed to training The line voltage rise time constant difference between the receiver termination being present and not present is quite large and differs by about ~40×, with a specified minimum of 25×.

Figure 5:
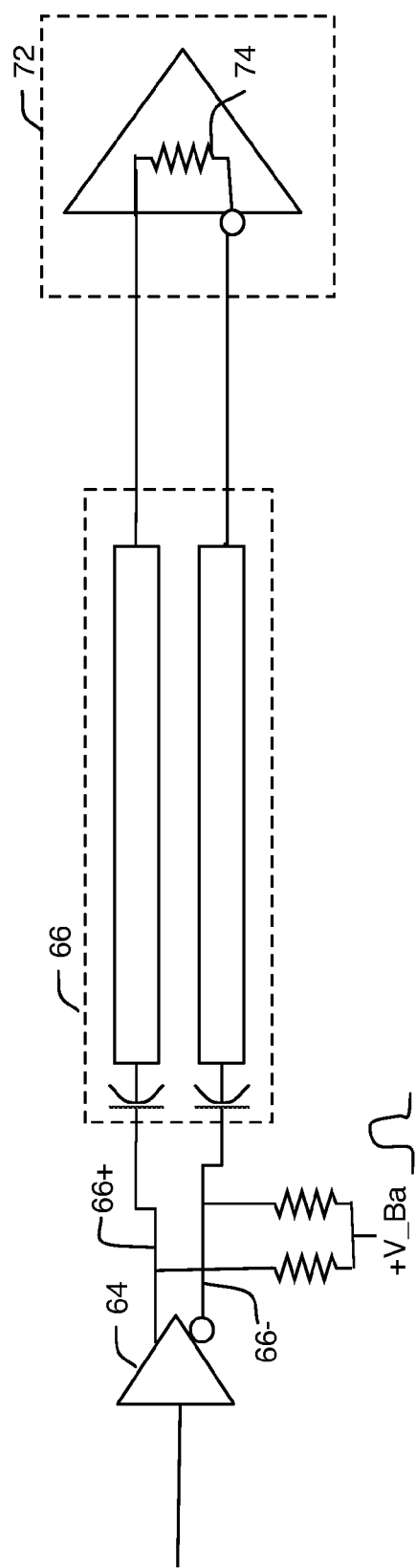
FIG. 5 is a schematic diagram of a PCI-E transmitter and SAS/SATA receiver model for PCI-E receive detect.

In FIG. 5, there is shown a similar transmission line as it would appear if including a SAS/SATA differential receiver 72 as would be found in the serial buffer 62 instead of a PCI_E receiver like 68. The SAS/SATA receiver 72 is a 100 ohm differential receiver functionally consisting of a 100 ohm resistor 74 coupled between the differential pair. Now, during the PCI-E Receive Detect function, when the common mode voltage receive detect signal is sent, no charging will occur across the resistor 74. The connection will appear as an open circuit. The transmitter will not recognize that a receiver is connected, and further training will not take place, even though the SAS/SATA serial buffer 62 is functionally capable of buffering the PCI-E signals during link training and full speed operation.

Figure 6:
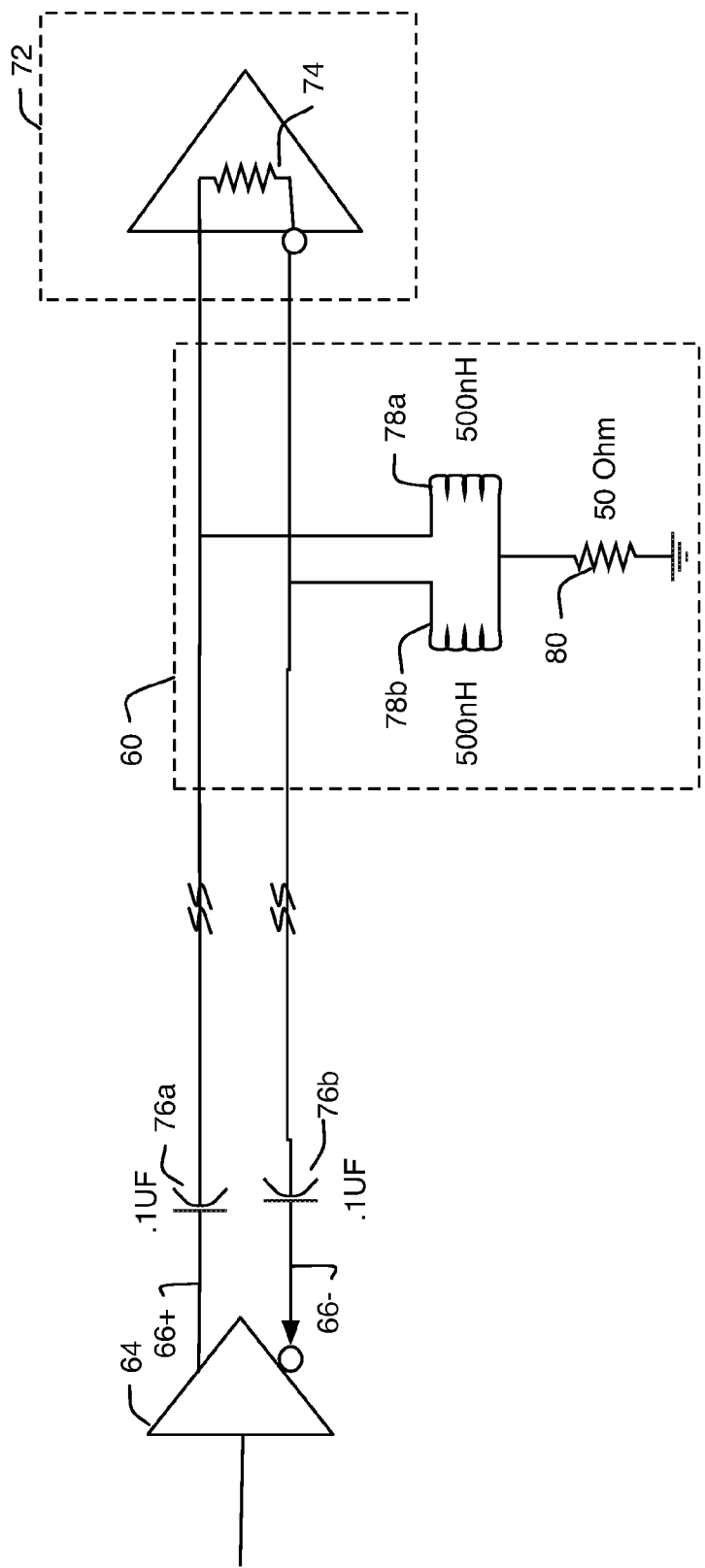
FIG. 6 is a schematic diagram of the invention.

In accordance with the principles of the invention, the receive detect logic 60 is coupled between the PCI-E switch 44 and the serial buffer 62 so that the PCI-E receive detect function detects the SAS/SATA receiver 72 in the serial buffer 62 as a valid PCI-E receiver. In FIG. 6, there is shown a PCI-E transmitter 64, such as would be found in the PCI-E switch 44, coupled to a SAS/SATA type receiver 72, such as would be found in the serial buffer 62. Each signal 66+, 66− of the differential pair between transmitter 64 and receiver 72 is shown. DC decoupling capacitors 76*a*, 76*b* are also shown. The receive detect logic 60 is coupled in parallel between the transmitter 64 and receiver 72. Within the receive detect logic 60, each signal 66+ and 66− of the differential pair is coupled in parallel to ground via a ferrite 78*a*, 78*b* and a resistor 80. The values herein shown for the ferrites are 500 nH, and for resistor 50 ohm. The receive detect logic 60 presents a low impedance path to ground during the low frequency receive detect function performed by the PCI-E transmitter. Thus, the 50 ohm resistor charges during the PCI-E receive detection function, and a valid PCI-E receiver is recognized. Once the line is charged, the receive detect logic 60 presents a high impedance path (about 1K ohm) during the high frequency link training and operational times, thus effectively removing the logic 60 from the circuit and minimizing signal integrity impact during high frequency operations. The values for the ferrites and resistor are not fixed at the values shown and can be changed as design requirements dictate as long as impedance and signal integrity requirements are met during low frequency receive detection and high frequency link training and operational phases. It has been found through experiment that signal integrity effects in one application were minimized by placing the logic 60 near the DC decoupling capacitors 76*a*, 76*b*. Advantageous results have also been obtained by placing the logic 60 midway between the transmitter 64 and receiver 72.

Figure 7:
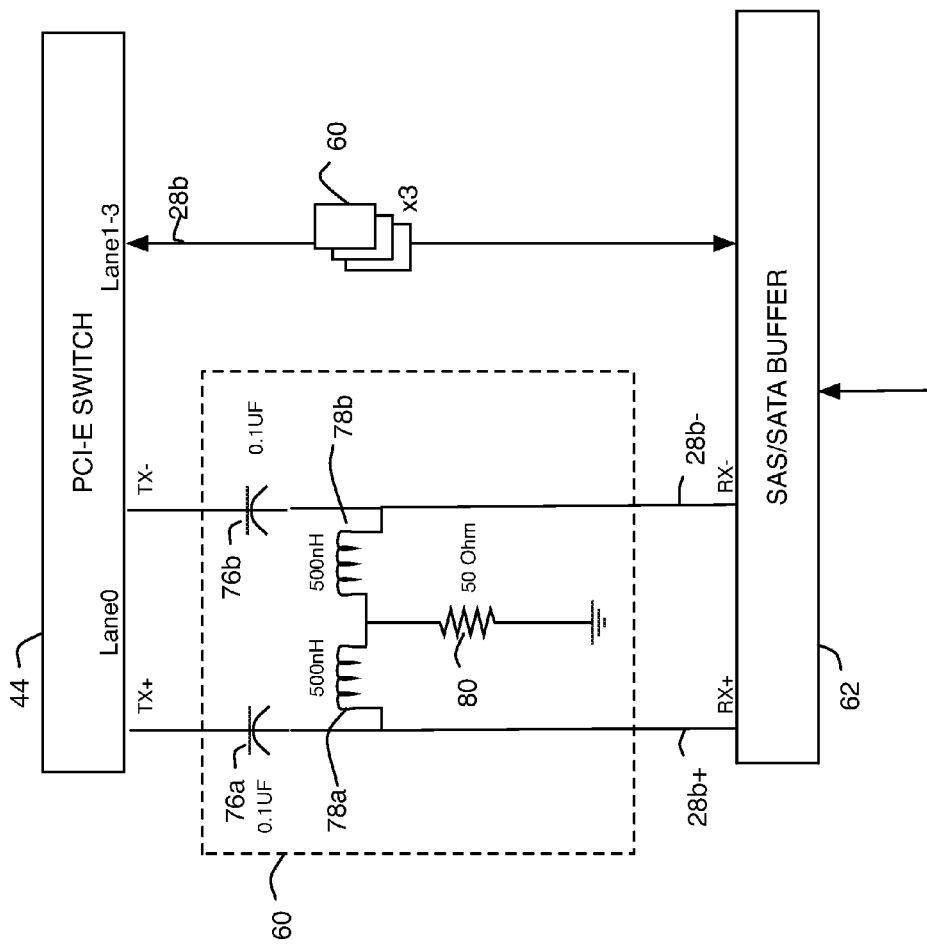
FIG. 7 is a schematic diagram of the invention incorporated between a PCI-E switch and a SAS/SATA buffer.

In FIG. 7, there is shown the invention as implemented between the PCI-E switch 44 and the SAS/SATA serial buffer 62 of FIG. 3. The PCI-E switch 44 and SAS/SATA serial buffer 62 are coupled via lanes of differential signals 28*b*, herein shown to be 4 lanes. The receive detect logic 60 is implemented on each of the 4 lanes 28*b*. One of the lanes 28*b* is shown in further detail as its differential pair 28*b*+ and 28*b*−. Within the receive detect logic 60, each signal 28*b*+ and 28*b*− of the differential pair is coupled to ground via a ferrite 78*a*, *b*, respectively, and a resistor 80.

Figure 8:
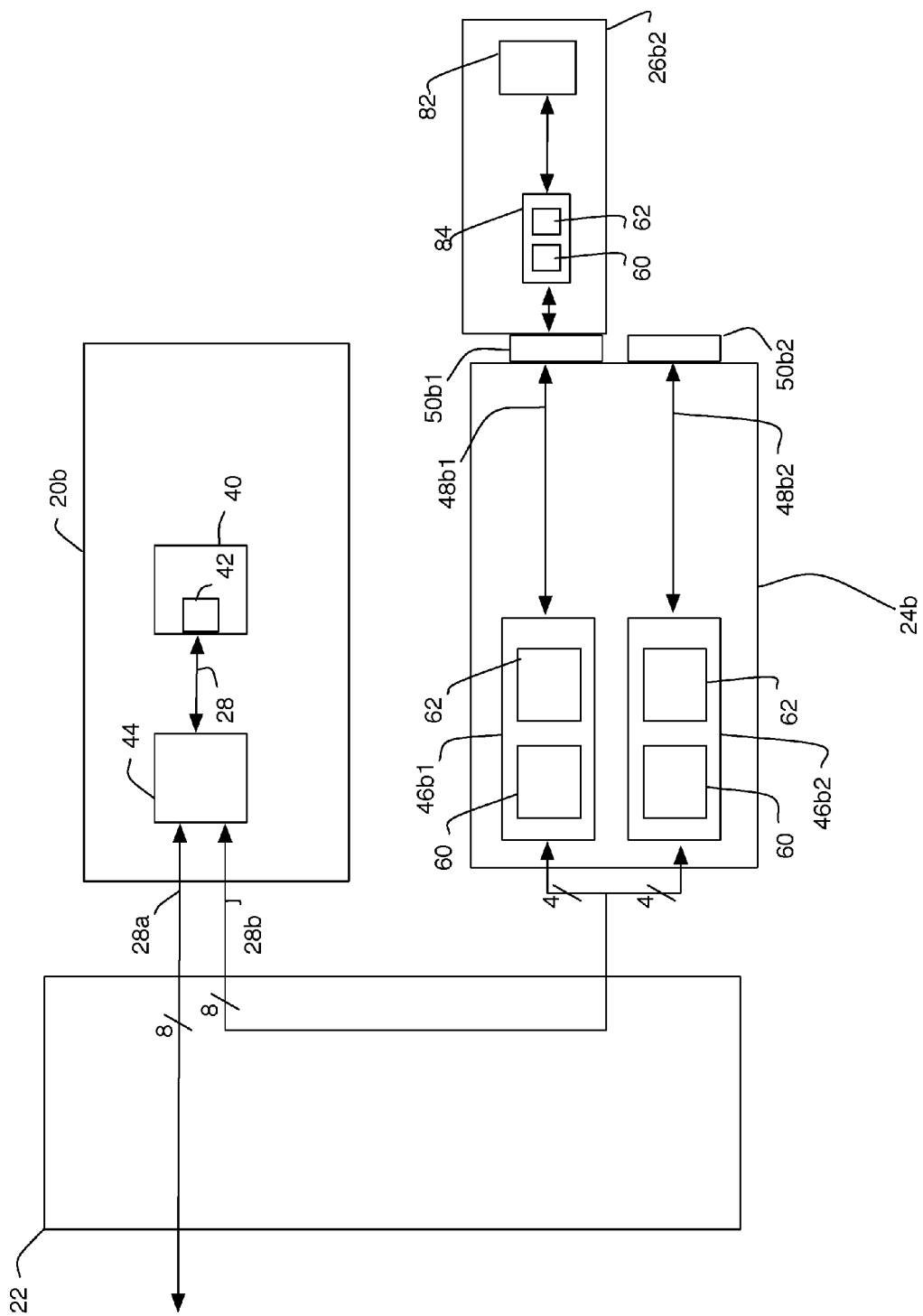
FIG. 8 is a schematic diagram of the invention used to extend a PCI-E interconnect.

FIG. 8 shows how the invention can be used to further extend a PCI-E interconnect. FIG. 8 shows the system of FIG. 3 with an I/O device 26*b*2 plugged in to the I/O board connector 50*b*1. The I/O device includes a PCI-E endpoint device 82. A signal buffer 84 in accordance with the invention is placed between the connector 50*b*1 and the device 82. The signal buffer 84 includes receive detect logic 60 and serial buffer 62. Serial buffer 62 is a non-PCI-E type buffer, but the receive detect logic 60 ensures that upstream PCI-E transmitters will detect the buffer 62 receivers as valid PCI-E receivers. In this manner, the PCI-E interconnect is further extended.

In accordance with the embodiments herein shown the receive detect logic 60 provides a way to extend a PCI-E interconnect through devices of a different, less expensive protocol device with lower latency, using very few components, in a way that has minor signal integrity impact.

In general, the logic of the invention allows a transmitter in a type one protocol device, herein embodied as a PCI-E device, to recognize a receiver in a type two protocol device, herein embodied as a SAS/SATA device, as a receiver of the type one protocol. It can be seen that the invention can be employed wherever a type one protocol device transmitter performs a detection function to detect attached type one protocol receivers, and wherein the detection function operates such that receivers having type two termination are not detected as type one protocol receivers. The logic of the invention is coupled between the type two protocol device receiver and the type one protocol device transmitter so that the type one protocol device transmitter detection function detects the type two protocol device receiver as a type one protocol receiver.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Furthermore, many functions described herein may be implemented in hardware or in software. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. A data storage system comprising:
   a plurality of processor blades;
   a plurality of I/O boards, each I/O board having connectors into which peripheral devices can be connected;
   a midplane;
   each I/O board comprising a type two protocol device having a type two protocol device physical layer receiver having type two physical layer termination;
   each processor blade comprising a type one protocol switch for connecting a type one protocol interconnect across the midplane to another processor blade or to an I/O board,
   each type one protocol switch comprising a type one protocol device physical layer transmitter that performs a physical layer detection function to detect attached type one protocol physical layer receivers, said detection function operating such that in response to a signal sent from the physical layer detection function, physical layer receivers having type one physical layer termination cause the type one protocol interconnect to charge and physical layer receivers having type two physical layer termination appear as an open circuit to said physical layer detection function;
   receive detect logic coupled between the type two protocol device physical layer receiver and the type one protocol device physical layer transmitter, the receive detect logic functional to cause the type one protocol device physical layer transmitter physical layer detection function to recognize the type two protocol device physical layer receiver as a type one protocol physical layer receiver by causing the type one protocol interconnect to charge and indicate a valid type one physical layer receiver; and
   a buffered type one protocol interconnect coupled between the type two protocol device physical layer receiver and connectors.

2. The system of claim 1 wherein the type one protocol interconnect is a PCI-E interconnect.

3. The system of claim 2 wherein the type two protocol device is a SAS device or a SATA device.

4. An I/O board for use in a data storage system comprising:
   a type two protocol device having a type two protocol device physical layer receiver having type two physical layer termination;
   connectors into which peripheral devices can be connected;
   receive detect logic for receiving type one protocol interconnect signals from a type one protocol device physical layer transmitter via a type one protocol interconnect across a midplane; the type one protocol device physical layer transmitter performing a physical layer detection function to detect attached type one protocol physical layer receivers, said physical layer detection function operating such that in response to a signal sent from the physical layer detection function, physical layer receivers having type one physical layer termination cause the type one protocol interconnect to charge and physical layer receivers having type two physical layer termination appear as an open circuit to said physical layer detection function;
   the receive detect logic functional to cause the type one protocol device physical layer transmitter to recognize the type two protocol device physical layer receiver as a type one protocol physical layer receiver by causing the type one protocol interconnect to charge and indicate a valid type one physical layer receiver; and
   a buffered type one protocol interconnect coupled between the type two protocol device physical layer receiver and connectors.

5. The I/O board of claim 4 wherein the type one protocol interconnect is a PCI-E interconnect.

6. The I/O board of claim 5 wherein the type two protocol device is a SAS device or a SATA device.

7. A method for use in a data storage system comprising the steps of:
   providing a plurality of processor blades, each processor blade having a type one protocol switch for connecting a type one protocol interconnect across a midplane to another processor blade or to an I/O board, each type one protocol switch comprising a type one protocol device physical layer transmitter that performs a physical layer detection function to detect attached type one protocol physical layer receivers, said physical layer detection function operating such that in response to a signal sent from the physical layer detection function, physical layer receivers having type one physical layer termination cause the type one protocol interconnect to charge and physical layer receivers having type two physical layer termination appear as an open circuit to said physical layer detection function;
   providing a plurality of I/O boards, each I/O board having connectors into which peripheral devices can be connected, each I/O board comprising a type two protocol device having a type two protocol device physical layer receiver having type two physical layer termination;
   providing a midplane;
   coupling receive detect logic between the type two protocol device physical layer receiver and the type one protocol device physical layer transmitter, the logic causing the type one protocol device physical layer transmitter physical layer detection function to recognize the type two protocol device physical layer receiver as a type one protocol physical layer receiver by causing the the type one protocol interconnect to charge and indicate a valid type one physical layer receiver; and coupling a type one protocol interconnect between the switch and the receive detect logic; and coupling a buffered type one protocol interconnect between the type two protocol device physical layer receiver and connectors.

8. The method of claim 7 wherein the type one protocol interconnect is a PCI-E interconnect.

9. The method of claim 8 wherein the type two protocol device is a SAS device or a SATA device.

10. A method for use with an I/O board in a data storage system comprising:

providing a type two protocol device having a type two protocol device physical layer receiver having type two physical layer termination;

providing connectors into which peripheral devices can be connected;

receiving by receive detect logic type one protocol interconnect signals from a type one protocol device physical layer transmitter via a type one protocol interconnect across a midplane; the type one protocol device physical layer transmitter performing a physical layer detection function to detect attached type one protocol physical layer receivers, said detection function operating such that in response to a signal sent from the physical layer detection function, physical layer receivers having type one physical layer termination cause the type one protocol interconnect to charge and physical layer receivers having type two physical layer termination appear as an open circuit to said physical layer detection function;

causing by the receive detect logic the type one protocol device physical layer transmitter to recognize the type two protocol device physical layer receiver as a type one protocol physical layer receiver by causing the type one protocol interconnect to charge and indicate a valid type one physical layer receiver; and coupling a buffered type one protocol interconnect coupled between the type two protocol device physical layer receiver and connectors.

11. The method claim 10 wherein the type one protocol interconnect is a PCI-E interconnect.

12. The method of claim 11 wherein the type two protocol device is a SAS device or a SATA device.

* * * * *